United States Patent
Zeiber et al.

(12)
(10) Patent No.: US 6,926,031 B2
(45) Date of Patent: Aug. 9, 2005

(54) LOW SPILL FARM COUPLING

(75) Inventors: Dennis Zeiber, Erie, PA (US); Paul J. Wadding, Centerville, PA (US)

(73) Assignee: Snap-tite Technologies, Inc., Wilmington, DE (US)

( * ) Notice: Subject to any disclaimer, the term of this patent is extended or adjusted under 35 U.S.C. 154(b) by 0 days.

(21) Appl. No.: 10/963,872

(22) Filed: Oct. 13, 2004

(65) Prior Publication Data

US 2005/0076961 A1 Apr. 14, 2005

Related U.S. Application Data

(63) Continuation of application No. 10/657,479, filed on Sep. 8, 2003, now Pat. No. 6,830,059.

(51) Int. Cl.[7] ............................................... F16K 29/00
(52) U.S. Cl. ............................. 137/614.03; 137/614.05
(58) Field of Search ....................... 137/614.05, 614.03, 137/614.04, 614; 251/149.6, 149.1

(56) References Cited

U.S. PATENT DOCUMENTS

| | | | |
|---|---|---|---|
| 3,730,221 A | 5/1973 | Viks | |
| 3,981,479 A | 9/1976 | Foster | |
| 4,077,433 A | 3/1978 | Maldavs | |
| 4,086,939 A | 5/1978 | Wilcox | |
| 4,249,572 A | 2/1981 | Shindelar et al. | |
| 4,303,098 A | 12/1981 | Shindelar | |
| 4,582,347 A | 4/1986 | Wilcox | |
| 4,598,896 A | 7/1986 | Maldavs | |
| 4,745,948 A | 5/1988 | Wilcox | |
| 4,881,573 A | 11/1989 | Durant | |
| 5,709,243 A | 1/1998 | Wells | |
| 5,730,185 A | 3/1998 | Wilkins | |
| 5,806,564 A * | 9/1998 | Wilcox | 137/614.05 |
| 5,918,633 A | 7/1999 | Zeiber | |
| 5,937,899 A | 8/1999 | Zeiber | |
| 6,026,857 A | 2/2000 | Stucchi | |
| 6,095,190 A | 8/2000 | Wilcox | |
| 6,116,277 A | 9/2000 | Wilcox | |
| 6,776,187 B1 | 8/2004 | Marquis | |

* cited by examiner

*Primary Examiner*—Kevin Lee
(74) *Attorney, Agent, or Firm*—Woodling, Krost and Rust

(57) ABSTRACT

A male coupling half includes a male valve and a male body and the female coupling half includes a female valve and an inner body. The inner body is slidingly movable with respect to a housing or manifold. The female coupling half further includes a valve seated against a dump valve body which relieves pressure in the female half of the coupling to enable easy connection of the coupling halves. The male and female valves are locked in their open positions when the coupling halves are fully connected and the female half is pressurized which prevents reverse flow checking in either flow direction. During the disconnection process the male valve is closed before the coupling halves are separated which traps pressure in the male coupling half.

12 Claims, 17 Drawing Sheets

LOW SPILL FARM COUPLING

This application is a continuation of Ser. No. 10/657,479, now U.S. Pat. No. 6,830,059, filed Sep. 8, 2003.

FIELD OF THE INVENTION

The invention is in the field of couplings which may be used on agricultural, construction or other equipment.

BACKGROUND OF THE INVENTION

There is a need for couplings to communicate hydraulic fluid to and from tractor mounted hydraulic power sources. There is also a need to communicate hydraulic fluid to and from agricultural or construction implements. A directional valve downstream from the power source controls the direction of the fluid in the hydraulic lines and, hence, the direction of the implement. Interposed between the directional valve and the load are a manifold and shut off valves. Typically, female coupling halves are carried in the manifold and male coupling halves are affixed to hydraulic lines leading to and from the implement. Use of a manifold is optional and female coupling halves may be mounted directly on the tractor or other device. It is therefore necessary to provide a coupling having valves which remain open and stable as the flow direction is reversed and which will not result in the valves closing upon reversal of flow and unintentionally and undesirably preventing flow (i.e., flow checking).

When an implement is disconnected (uncoupled) from the manifold, it is desirable to maintain implement in a safe position by trapping fluid under pressure in the hydraulic lines between the male half of the coupling and the implement. The trapped fluid enables safe positioning of the implement until its next use. Sunshine and/or ambient heating further raise the pressure in the hydraulic lines leading to the implement making it difficult to connect (couple) the male coupling half into the female coupling half of the manifold for continued operation of the implement. When an implement is uncoupled from the manifold, fluid is also trapped between the female half of the coupling and a shut off valve interposed between the manifold and the directional control valve. Sunshine and/or ambient heating tend to increase the pressure of hydraulic fluid in the hydraulic lines and in the coupling making it difficult to couple the halves of the coupling together.

In some applications, shut off valves are used to intentionally trap fluid between the shut off valve and the load when the load remains connected so as to maintain the safe positioning of the implement. The shutoff valves or their functional equivalent may be integral with the directional valve. In this instance too, sunshine and/or ambient heating tend to increase the pressure of hydraulic fluid in the hydraulic lines and in the coupling.

It is desirable to provide a coupling which makes disconnection of the coupling halves easier and reduces or eliminates spillage.

It is desirable to provide a coupling which enables the male half of the coupling to close prior to disconnection of the coupling so as to minimize spillage and so as to trap pressure in the male coupling half and the hydraulic line leading to the implement.

It is desirable that the coupling halves be capable of connection under pressure, that is, with pressure applied to both halves of the coupling. It is further desirable that pressure be reduced or eliminated in the female half of the coupling to facilitate coupling.

U.S. Pat. No. 5,937,899 to Zeiber discloses a female cartridge which is retained within a manifold. Axial and radial vent valves are disclosed. The '899 patent provides a male half of the coupling which pushes the inner body of the pressurized female half of the coupling (which includes a pressurized chamber between a piston and a relief valve positioning member) causing the positioning member to be displaced in a leftward or rearward direction which causes the venting of the female member. The male half of the coupling pulls the inner body of the female half of the coupling rightwardly or forwardly which causes the venting of the female member. The venting occurs when the male and female halves of the coupling are connected or disconnected.

U.S. Pat. No. 5,709,243 to Wells et al. discloses a low spill female coupling. A valve having an enlarged head is adapted to receive a male valve from the male half of the coupling such that the valves remain closed until respective parts thereof are brought into contact with each other so as to minimize spillage.

U.S. Pat. No. 6,095,190 to Wilcox et al. discloses a female coupling half having internal pressure relief. The female half has three valves: a main valve, a relief valve and a sliding sleeve valve. The relief valve is a ball and seats against an elastomeric seal mounted on the back side of the main valve. A push pin having flat edges operates the relief valve.

U.S. Pat. No. 4,077,433 to Maldavs illustrates a piston valve arrangement with a passageway through the valve to assist in assuring that the male ball valve remains open in high flow conditions from the male to the female. U.S. Pat. No. 4,881,573 to Durant illustrates a coupler having two poppet valves. The first poppet engages a ball check valve formed in the male coupling and the second poppet is actuated by a manually operated cam. A passageway exists in the piston to allow fluid to be vented or to pressurize the female valve.

U.S. Pat. No. 4,598,896 to Maldavs illustrates a coupler having a spool and a port within the spool. An annular seal is fixedly positioned about the port in the spool. The spool is slidable with respect to the seal which enables pressure to be relieved in the female during coupling and uncoupling with the male. U.S. Pat. No. 4,303,098 to Shindelar discloses a coupler having a female half which includes a female valve having an elongated stem for engaging the male half. The female half of the coupling is vented by a pivotable cam which moves the inner member of the female half to release its locking means and then opens a poppet valve to open the outlet port.

U.S. Pat. No. 4,249,572 to Shindelar et al. discloses a female half which is self-relieving. The female half includes dual poppet valves which are linked together. One of the poppet valves vents the female half of the coupling when the male and female valves are disengaged and uncoupled.

U.S. Pat. No. 5,730,185 to Wilkins et al. discloses a coupling wherein certain positions of the adaptor allow the venting of the dispenser half and the receptacle half. Venting is prohibited by the movement of seals relative to ports and passageways.

U.S. Pat. No. 3,730,221 to Vik provides an exterior vent valve.

U.S. Pat. No. 4,745,948 to Wilcox et al. discloses a coupling device which utilizes locking detents which lock a stem against the male valve which prevents reverse flow checking.

SUMMARY OF THE INVENTION

A female coupling half for use with a male coupling half is disclosed. The male coupling half includes a male valve and a male body. The female coupling half includes an outer body, a housing, an inner body and a female valve. The inner body is slidingly movable with respect to the housing between a first position and a second relief position. The housing resides partially within the outer body forming an annular passageway therebetween.

Another embodiment of the invention employs a female coupling half which includes a cartridge retained within a manifold. In this embodiment, flow through the female coupler half is radially directed to a port in the manifold.

In both embodiments, an inner body adaptor is affixed to the inner body. A dump valve body and lock piston slidingly engage the inner body adaptor. A dump valve (relief valve) is seated against the dump valve body. A valve lock shaft is slidingly engageable within the lock piston. During connection of the coupling halves under pressure, the female valve is affixed to the valve lock shaft and movable therewith between a first position and a relief position. The male body engages the inner body member and the male valve engages the female valve urging them from their first positions to other positions upon insertion of the male coupling half into the female coupling half.

During connection of the coupling halves under pressure, the dump valve moves with the inner body member actuating the dump valve relieving pressure within the female coupler half. Before coupling and during venting, the valve lock shaft and the lock piston are releaseably secured to one another. As coupling begins and venting occurs the male body urges the inner body of the female coupling half leftwardly and carries the valve dump body, the valve lock piston, the sliding sleeve, the retainer and the valve lock shaft with it. Detents carried by the inner body engage the male body and the inner body member is urged leftwardly. At this time the male valve remains closed and has not yet engaged the female valve. Further, at this time the male body has not yet engaged the retainer of the female coupling half.

Coupling continues further by urging the male half of the coupling further into the female half of the coupling such that the body of the male first engages the retainer followed by the male valve engaging the female valve. Since the body of the male engages the retainer slightly in time before the male valve engages the female valve the retainer and seal carried by the retainer separate slightly from the lip of the female valve. This enables subsequent repressurization of the female coupler to open the male valve and to further open the female valve. As the coupling progresses, the female valve and valve lock shaft are driven rearwardly causing detents carried in the lock piston to exit a circumferential recess in the valve lock shaft. A lock sleeve is positioned against a snap ring secured in the sliding sleeve by a spring operable between a shoulder on the sliding sleeve and the lock sleeve. As the retainer is engaged by the male body member, the sliding sleeve of the female coupler half is urged leftwardly which, in turn, urges the lock sleeve leftwardly through the spring operable between the lock sleeve and the sliding sleeve. When the coupling is disconnected, the lock sleeve is spaced apart from the detents carried in the lock piston. This allows for the detents to be displaced from the recess in the valve lock shaft before the lock sleeve drives the detents and the lock piston leftwardly. Therefore, as the male body engages the retainer followed by the the male valve engaging the female valve, the sliding sleeve, the valve lock shaft and the lock sleeve all begin to move leftwardly while the coupling is vented. The movement of the lock piston is delayed, however, until the lock sleeve drives it leftwardly.

Next, the force on the male coupling half (i.e., the force exerted by a human hand) is removed and the coupling is fully connected but the male valve remains closed until pressure is applied to the female coupling half. At this time the female valve is slightly open. As pressurization of the female coupling half begins pressure equalization of the male and female halves occurs. The male and female valves shift rightwardly until the valve lock shaft moves sufficiently rightwardly that the detents carried by the lock piston are urged radially inwardly to engage a circumferential recess in the valve lock shaft. The lock sleeve secures the detents in the recess while the coupling is engaged ensuring that the male and female valves in the coupling remain open during use of the coupling. This prevents unwanted reverse flow checking.

To disconnect the pressurized coupling, the male coupling half is urged leftwardly into the female coupling half to vent the female half of the coupling. As the male coupling half is urged leftwardly, pressure in the coupling urges the coupling halves apart and acts upon the interface between the body of the male coupling half and the inner body member locking the detents carried by the inner body member into engagement with the land on the locking sleeve. Once pressure is vented from the coupling, the male body no longer applies force on the detents carried by the inner body member allowing them to move radially inwardly and out of frictional engagement with the land on the lock sleeve. A spring is operable between the vent valve and the valve lock shaft. The spring is compressed as the vent valve engages the housing or, in another embodiment, the manifold body. As pressure is relieved by the vent valve from the coupled condition, pressure is first reduced in the piston chamber formed by the lock piston, the valve dump body and the inner body adaptor. The piston chamber is separated from the remainder of the female coupling half by a resistance in the form of an annular passageway about the stem of the vent valve and the inside diameter of the valve lock shaft. An additional resistance in the form of a vent passageway is formed in the vent lock shaft. These resistances isolate the chamber from the fluid pressure external to the valve lock shaft. In particular, a seal between the lock piston and the inner body adaptor and a seal between the valve lock shaft and the lock piston experience relatively lower pressure as the chamber is vented as compared to seals which reside externally to the valve lock shaft. Specifically, a seal which operates between the valve lock shaft and the lock piston and a seal which operates between the sliding sleeve and the lock piston experience relatively high pressure. The differential pressure on the aforementioned seals results in shuttling the valve lock shaft leftwardly enabling the male and female valves to seat prior to disconnection. At this time the male valve engages the female valve such that no space is created therebetween so as to minimize fluid spillage on disconnection. The coupling halves are then pulled apart and separated with pressure trapped within the male coupling half so as to enable the safe positioning of an implement.

If the male and female coupling halves are not pressurized the male coupling half is inserted into the female coupling half urging the inner body member leftwardly. The inner body adaptor, the valve dump body, and the relief valve are all moved leftwardly under the urging of the male body against the inner body member of the female valve. The male valve engages the female valve as coupling progresses. The relief valve engages the bore of the manifold and the spring operable between the relief valve and the valve lock shaft overcomes the spring operable between the male valve and the canister in the male valve opening the male valve. The female valve opens simultaneously with the opening of the male valve.

The coupling may be easily separated if it is not under pressure as the coupling halves are not pressure locked together. Separation in the absence of pressure is accomplished by pulling the male body member and valve away from the female half of the coupling. A spring operable between the inner body adapter and the sliding sleeve urges the sliding sleeve and retainer rightwardly. As the male valve is withdrawn from the female valve, a spring operable between the canister of the male coupling half and the male seal retainer urge the male valve to its closed position.

It is an object of the present invention to provide a coupling which is a low spill coupling on connection and disconnection.

It is a further object of the present invention to provide a coupling which may be easily connected with pressure applied within the female coupling half and/or the male coupling half.

It is a further object of the present invention to provide a coupling having a female coupling half which is manifold mounted.

It is a further object of the present invention to provide a coupling which locks the valves of the male and female coupling halves in the open position and which prevents reverse flow checking of the male and female valves in the event that the direction of the flow is reversed or changes.

It is a further object of the present invention to provide a coupling which opens and locks the male and female valves of the coupling halves in the open position by applying pressure to the female half of the coupling once it is coupled together with the male.

It is a further object of the present invention to provide a coupling which enables the male coupling half to trap pressure therein upon disconnection of the coupling.

These and other objects of the invention will be better understood when the Brief Description of the Drawings, Description of the Invention and Claims set forth below are read.

BRIEF DESCRIPTION OF THE DRAWINGS

FIG. 1C also illustrates the female valve off its seal, slightly open.

FIG. 6A is a left side view of the housing.

FIG. 6B is a right side view of the housing.

A better understanding of the drawings and the invention will be had when reference is made to the Description of the Invention and Claims which follow hereinbelow.

DESCRIPTION OF THE INVENTION

Figure 1:
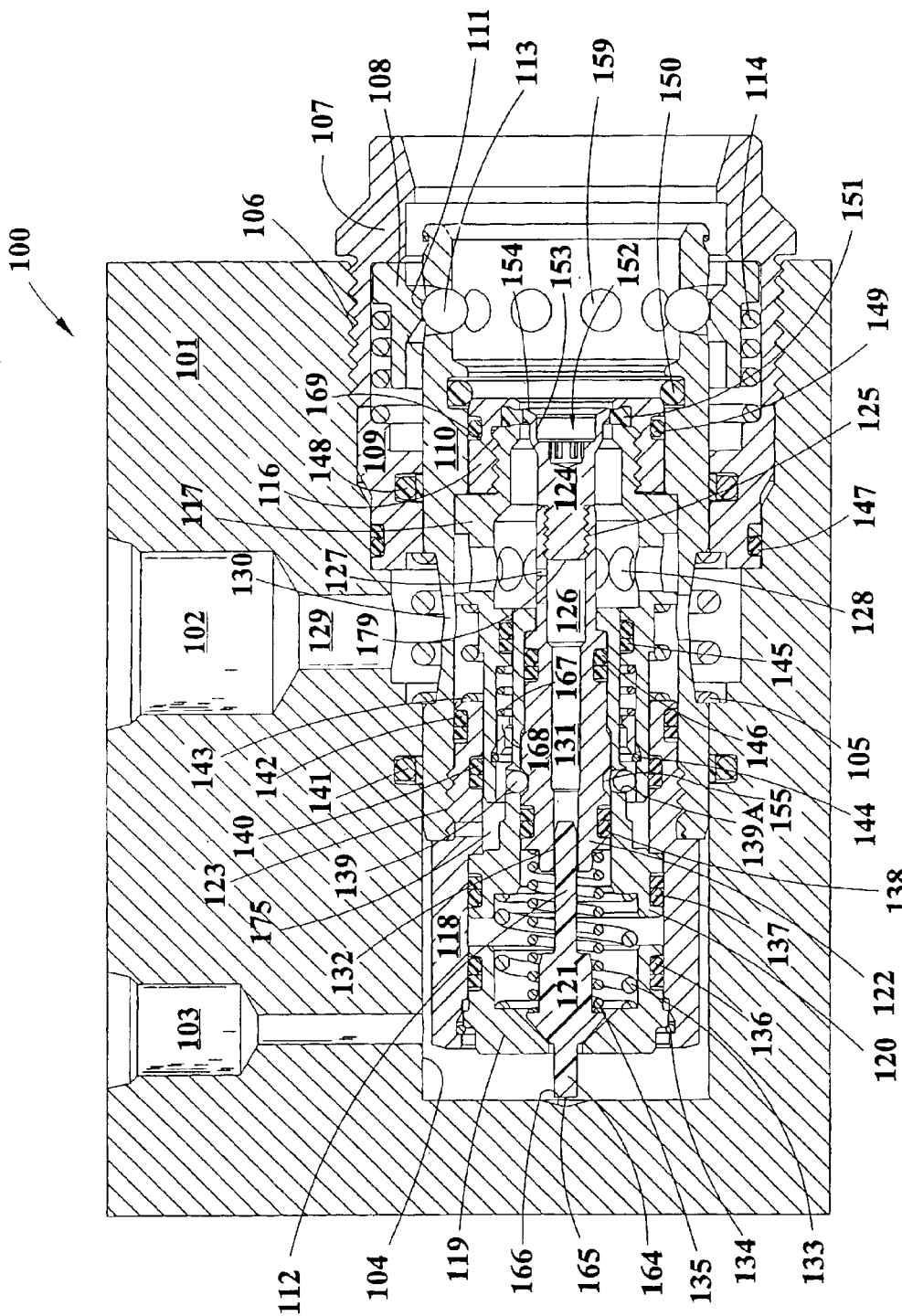
FIG. 1 is a cross-sectional view of a manifold illustrating a female half of the coupling inserted therein.
Figure 1A:
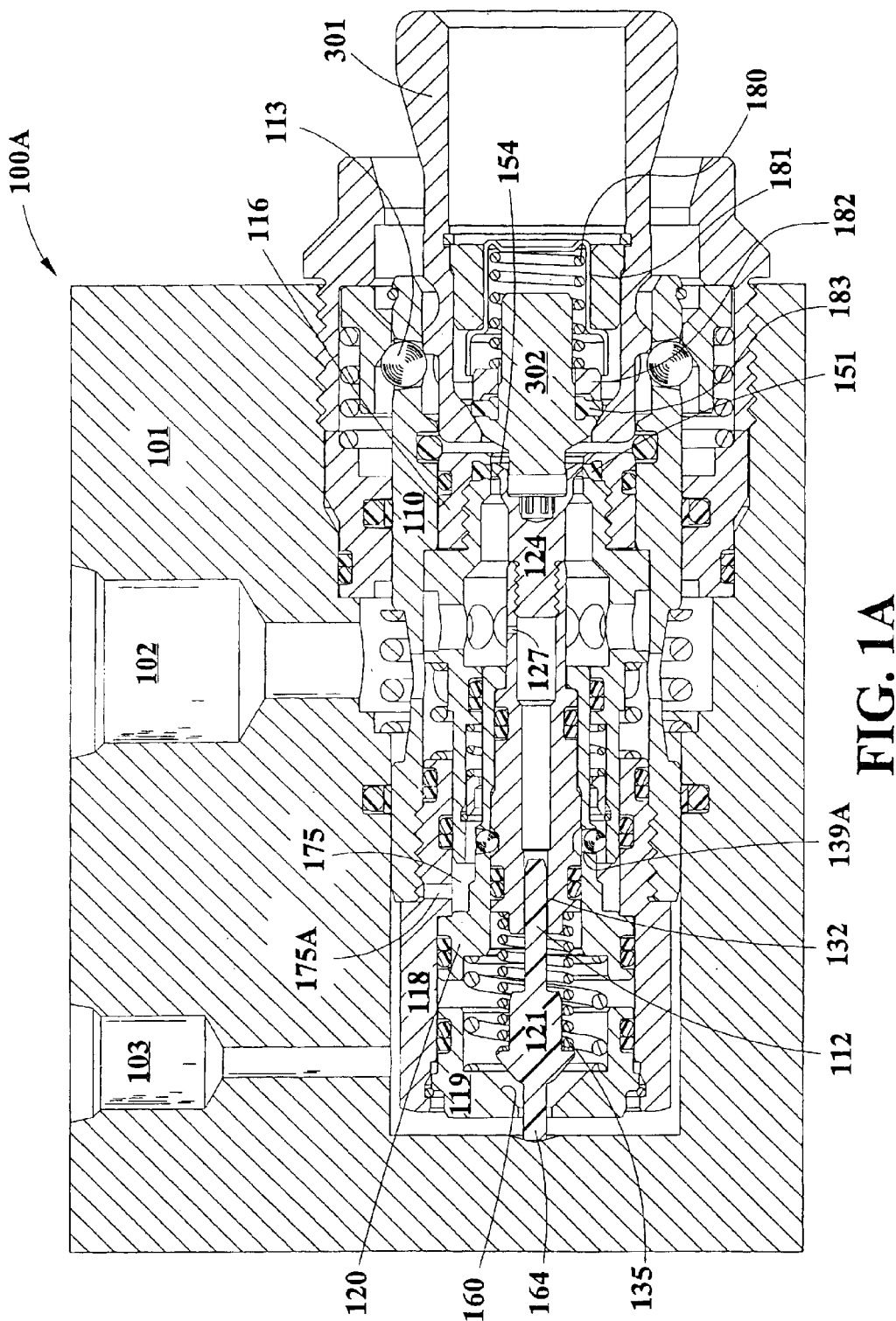
FIG. 1A is a cross-sectional view of a manifold illustrating the male half of the coupling entering the female half of the coupling which is being vented.
Figure 1B:
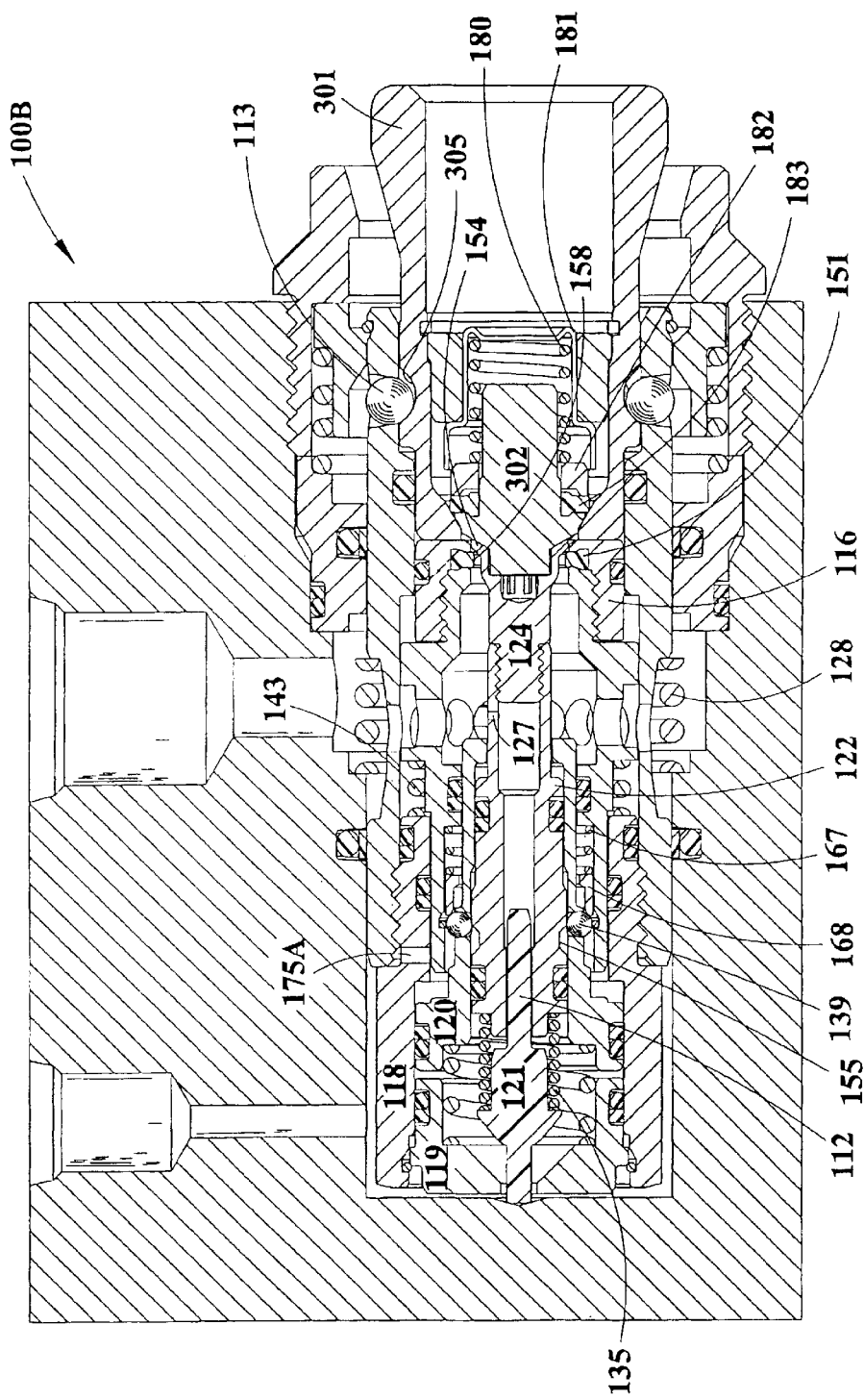
FIG. 1B is a cross-sectional view of a manifold illustrating the male half of the coupling fully inserted into the female half of the coupling which is being vented.
Figure 1C:
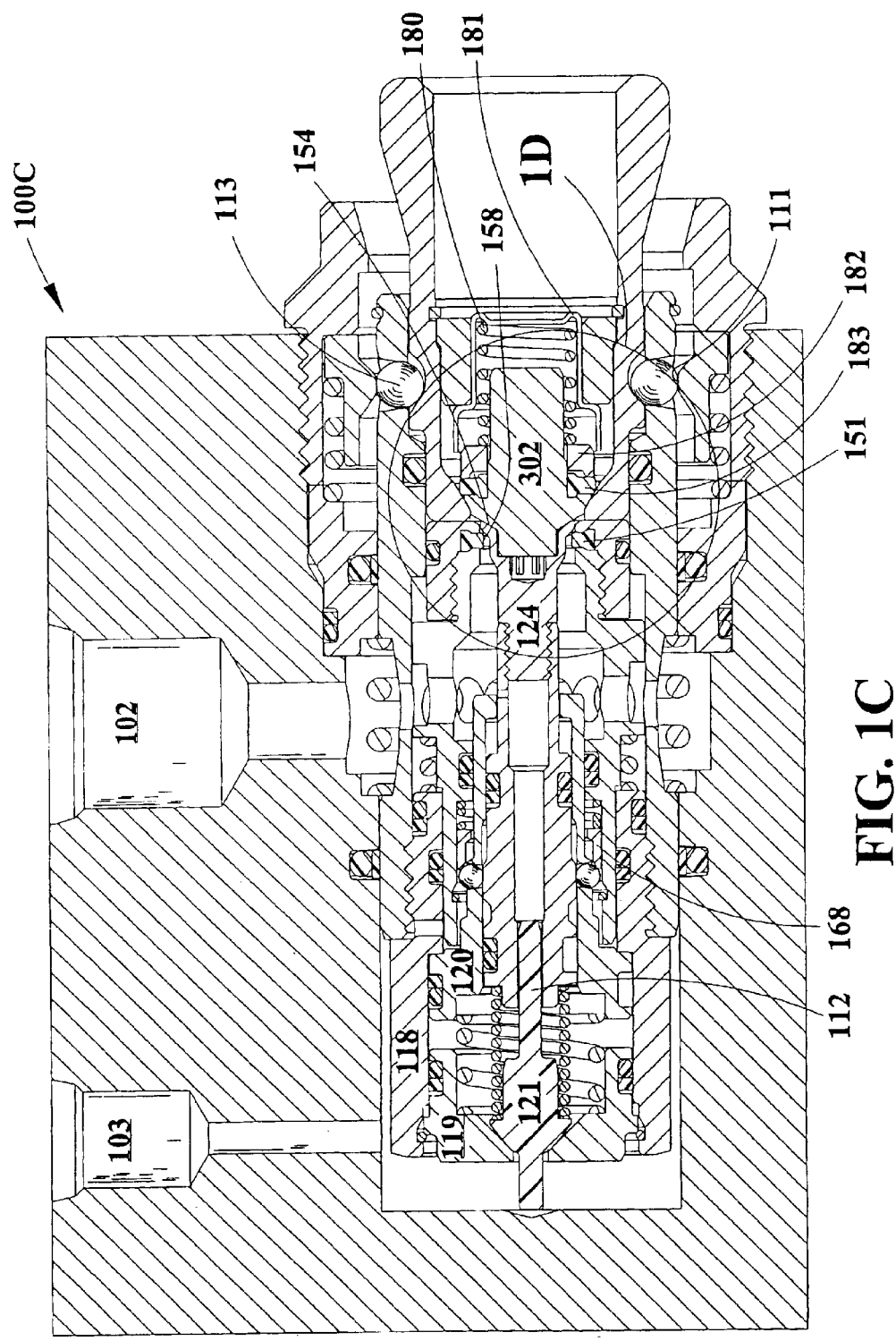
FIG. 1C is a cross-sectional view of a manifold illustrating the coupling fully connected with the male valve of the male half of the coupling closed.
Figure 1D:
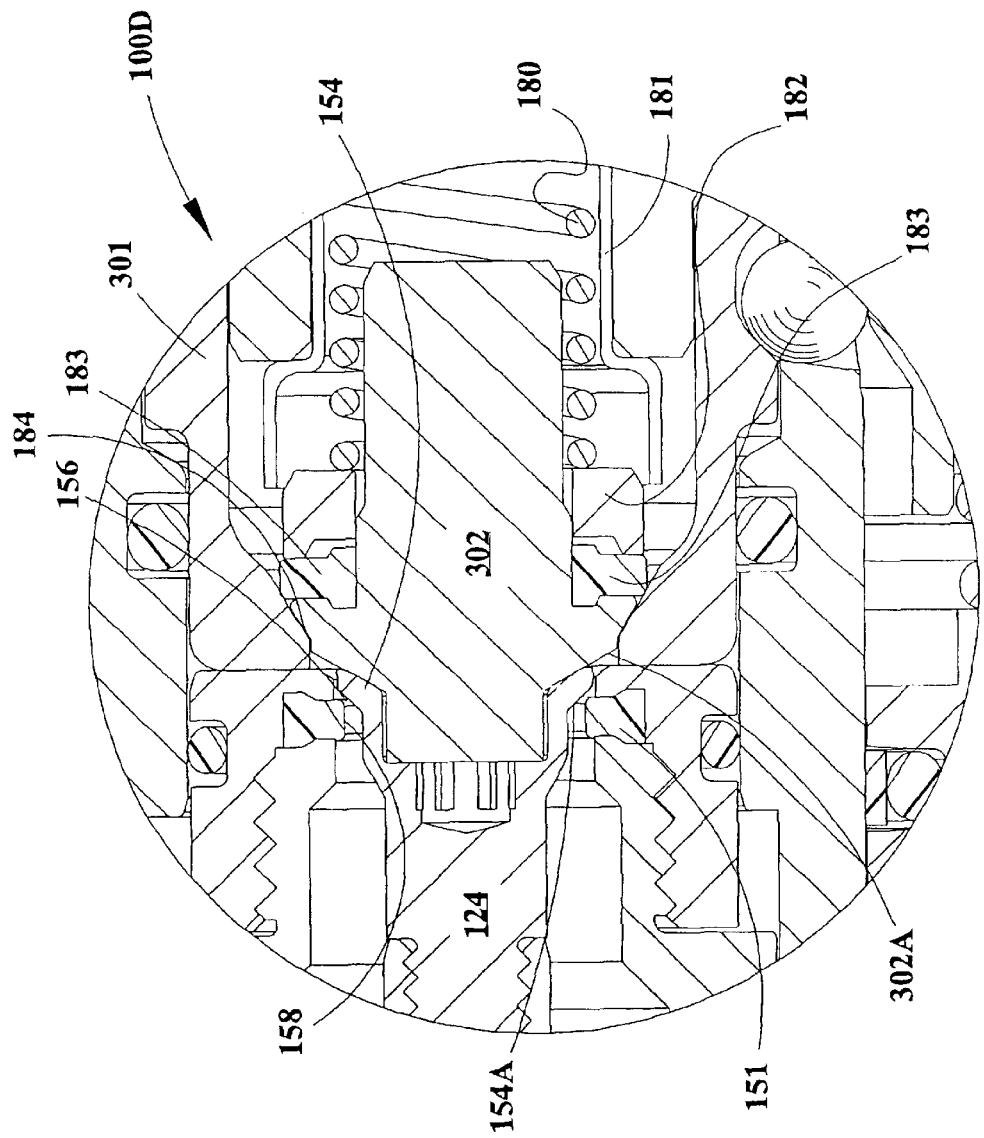
FIG. 1D is an enlargement of a portion of FIG. 1C illustrating the closed male valve and the slightly open female valve.

FIG. 1 is a cross-sectional view 100 of manifold 101 with a female half of the coupling inserted therein. FIGS. 1–1I illustrate a first embodiment of the invention which includes a manifold mounted female coupling half. FIGS. 2–6B illustrate a second embodiment of the invention.

FIG. 1 illustrates a cartridge of female coupling elements carried in a manifold 101. In FIG. 1, the female coupling half is illustrated. Conduit 102 leads to a hydraulic energy source. Vent conduit 103 communicates with bore 104 in the manifold 101. Spring 105 is operable between manifold body 101 and inner body 110. As the male body engages the inner body 110 it is urged leftwardly against the force of spring 105. See FIG. 1A. Once inner body 110 is moved far enough leftwardly, relief valve 121 engages indentation 166 in bore 104. Relief valve 121 includes pin 164 having end 165 which engages indentation 166 in the bore 104. Instead of indentation 165, a flat surface terminating the bore 104 may be used.

Valve 121, a relief valve, operates against seat 160 on valve dump body 119. Valve lock shaft 122 is hollow and stem 112 of valve 121 slides within valve lock shaft 122. There is a very small clearance 132 between stem 112 and the inside diameter of valve lock shaft 122. Spring 135 is operable between valve lock shaft 122 and valve 121 urging valve 121 to engage seat 160 of valve dump body 119. See FIG. 1A.

Valve dump body 119 is slidingly engageable within inner body adaptor 118 which is, in turn, affixed to inner body 110. Lock piston 120 is also slidingly engageable within inner body adaptor 118. Spring 133 urges the dump valve body 119 and lock piston 120 apart. Lock piston 120 is restrained in its rightward movement by a shoulder on the inner body adaptor 118 and dump valve body 119 is restrained in its leftward movement by snap ring 134 in a groove in the inner body adaptor 118. Inner body adaptor 118 is threaded 123 to the inner body 110.

Still referring to FIG. 1, female valve 124 is threaded 125 to valve lock shaft 122 and is movable therewith. Sliding sleeve 117 resides generally between the inner body member 110 and inner body member adaptor 118 and the valve lock shaft 122. Retainer 116 is threaded to the sliding sleeve 117 and retains seal 151 which abuts and seals lip 154 of valve 124 as illustrated in FIG. 1. Seal 151 is preferably a polymeric nitrile seal. FIGS. 1A and 1B illustrate male body 301 engaging retainer 116 separating seal 151 away from lip 154 which enables the repositioning of valves 124, 302 to their open position upon pressurization of the female half of the coupling.

Spring 143 is operable between inner body adaptor 118 and a shoulder on sliding sleeve 117. Sleeve 117 is restrained in its movement in the rightward direction when viewing FIG. 1 by the inner body 110. Lock sleeve 168 resides generally between sleeve 117 and lock piston 120. Spring 167 is operable between a shoulder on sliding sleeve 117 and lock sleeve 168. Leftward movement (viewing FIG. 1) of lock sleeve 168 is prevented by snap ring 144.

Lock piston 120 includes a plurality of apertures 139A in which reside detents 139. As viewed in FIG. 1, some of the detents 139 are illustrated sitting in recess 155 and some of the detents 139 are shown out of the recess 155 due to gravity. Valve lock shaft 122, under certain conditions discussed below, is free to move axially rearwardly (leftwardly) upon the urging of the male half of the coupling which is not shown in FIG. 1. Valve lock shaft 122 includes hollow sections or passageways 131, 126. Vent passageway 127 communicates with apertures 128 in the sliding sleeve 117 which in turn communicate with circumferentially spaced apertures 130 in the inner body 110. Passageway 129 communicates with conduit 102 to supply or return fluid depending on the position of the directional valve. Seals 141, 148 seal the inner body 110 with respect to the manifold 101 and the seal retainer 109, respectively. Seal 147 prevents leakage between the seal retainer 109 and the manifold 101.

Adaptor 107 is threaded 106 into manifold 101. Locking sleeve 108 is biased by spring 114 to a forward position as illustrated in FIG. 1. Locking detents 113 carried in apertures 159 of inner body 110 are secured in position by land 111 on locking sleeve 108.

Still referring to FIG. 1, entrance seal 150 prevents leakage between the male body and inner body 110 upon entrance of the male body into the female coupling half. Seal 149 prevents leakage between the interface between retainer 116 and inner body 110. Seal 142 prevents leakage between the inner body adaptor 118 and inner body 110. Seal 140 prevents leakage between the sliding sleeve 117 and the inner body adaptor 118. Seals 138, 146 prevent leakage between the valve lock shaft 122 and the lock piston 120. Seal 136 prevents leakage valve dump body 119 and inner body adaptor 118. Seal 137 prevents leakage between lock piston 120 and inner body adaptor 118. Seal 145 prevents leakage between the sliding sleeve 117 and lock piston 120.

Valve 124 includes an opening 152 having a cylindrical bore 153 for reception of the male valve. Lip 154 engages nitrile seal 151 as illustrated in FIG. 1.

Atmospheric vent 175 resides between sliding sleeve 117 and inner body adaptor 118. As sliding sleeve 117 is moved toward the inner body adaptor against the bias of spring 143, air is evacuated to vent 103. Air escapes along passageway 175A as illustrated in FIG. 1A and along the interface between the inner body 110 and the adaptor 118.

FIG. 1A is a cross-sectional view 100A of a manifold illustrating the male half of the coupling entering the female half of the coupling. Body 301 of the male coupling half engages the detents 113 carried in the inner body member 110 and drives the inner body member 110 leftwardly as illustrated in FIG. 1A. Relief (dump) valve 121 is carried by the body adaptor 118 affixed to the inner body member 110, the dump valve body 119 and the lock piston 120. Spring 135 biases relief valve 121 against a seat 160 on the dump valve body 119. As the inner body member 110 is urged leftwardly, pin 164 of relief valve 121 engages the indentation 166 in bore 104 of the manifold which vents the female half of the coupling. As viewed in FIG. 1A, venting occurs prior to the male valve 302 engaging the female valve 124 and prior to the male body 301 engaging the retainer 116.

Still referring to FIG. 1A, it will be observed that prior to engagement of the male and female valves that some of the detents 139 carried by apertures 139A in the lock piston 122 reside loosely in recess 155. Other detents 139 are not in recess 155 because gravity causes them to exit recess 155.

FIG. 1B is a cross-sectional view 100B of a manifold illustrating the male half of the coupling fully inserted into the female half of the coupling. Detents 113 are shown engaging a circumferential recess 305 in male body 301 in FIG. 1B. Referring to FIG. 1B, male and female valves 124, 302 are in engagement and valve lock shaft 122 is driven rearwardly such that the detents 139 exit recess 155 and ride on the exterior of valve lock shaft 122. Lock piston 120 moves leftwardly by engagement of lock sleeve 168 with detents 139 carried in apertures 139A in lock piston 120. Spring 167 is operable between lock sleeve 168 and sliding sleeve 117. Lock sleeve 168 is driven by spring 167 which, in turn, is driven by sliding sleeve 117. As sliding sleeve 117 is driven leftwardly, air in volume 175 (FIG. 1) exits through passageway 175A and past the interface between the inner body member 110 and the body adaptor 118.

Still referring to FIG. 1B, lip 154 of valve 124 does not engage seal 151. See also FIGS. 1C and 1D which illustrate a gap 156 between the inner portion 158 of seal 151 and lip 154 of valve 124. In FIG. 1B, inner body member 110 is shown fully leftwardly with springs 128, 133, 135 and 143 compressed. In FIG. 1B the female coupling is vented and male body 301 has forced retainer 116 and seal 151 away from lip 154 of female valve 124. This positional relationship of the retainer 116 and seal 151 with respect to lip 154 is fixed and maintained by body 301 engaging locking detents 113 as illustrated in FIG. 1C. Even after the force applied by hand to body 301 is released, land 111 in sleeve 108 keeps retainer 116 and seal 151 slightly spaced apart from lip 154 of valve 124.

FIG. 1C is a cross-sectional view 100C of a manifold illustrating the coupling fully connected with the male valve 302 of the male half of the coupling closed. Female valve 124 is open as viewed in FIG. 1D, an enlargement of a portion of FIG. 1C. Referring to FIG. 1D, female valve 124 is illustrated as spaced apart from seal 151 and slightly open. As illustrated in FIGS. 1C and 1D, the female half of the coupling is ready for pressurization against a closed and pressurized male valve 302. The opening of male valve 302 is facilitated by pressurizing of the female half of the coupling and the volume 156. Volume 156 leads to the interface 184 between valve 302 and male body 301 exposing seal 183. When the female half is pressurized the entire inner surface 154A of the lip 154 of the valve 124 is subjected to pressure as is a portion 302A of the male valve, the interface 184 between valve 302 and male body 301, and seal 183. See, FIG. 1D.

Figure 1E:
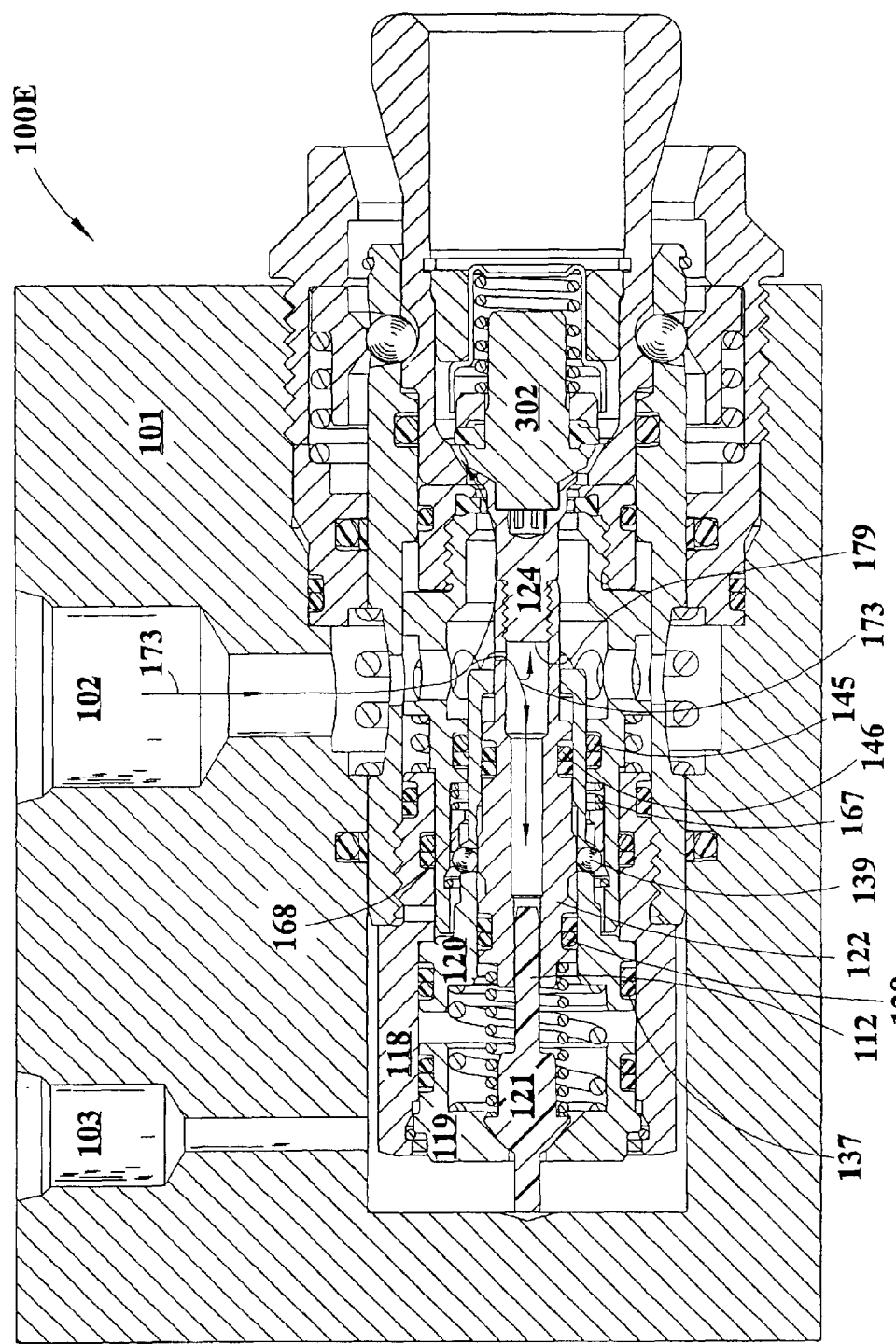
FIG. 1E is a cross-sectional view of the coupling with the female half pressurized, partially opening the male valve of the male coupling half.
Figure 1F:
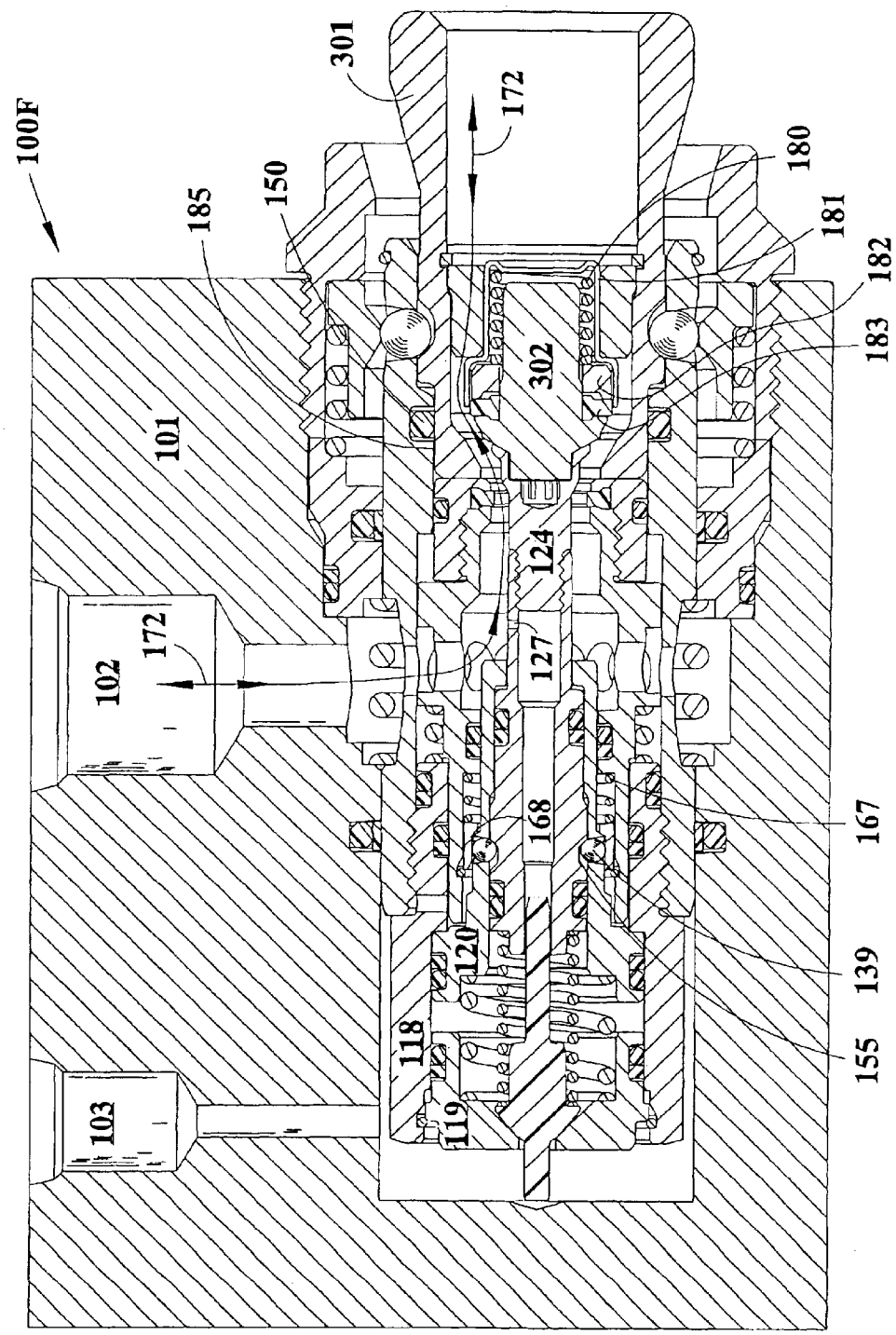
FIG. 1F is a cross-sectional view of the coupling with the male and female valves in the fully open position.

FIG. 1E is a cross-sectional view 100E of the coupling with the female half pressurized, partially opening the male valve 302 of the male coupling half and further opening the female valve 124. Reference numeral 173 represents pressure applied to the female half enabling the opening of the male half under pressure. It will be noticed in FIGS. 1C and 1E that the valve lock shaft is not locked with respect to the lock piston. As pressure is applied to the female half, and, more specifically, as pressure is applied to surface 179 of valve 124 (the inner surface), the interior rightward looking surfaces of the inner body 110, sliding sleeve 117, and lip 154A of valve 124 urge the valve 124 and the valve lock shaft 122 rightwardly opening the valves 124, 302 until balls 139 enter recess 155 as illustrated in FIG. 1F. Additionally, as pressure is applied to seals 138 and 146, the area of seal 138 and the rightward looking area of valve lock shaft 122 is slightly larger than the area of seal 146 and the leftward looking area of valve lock shaft 122 which contributes to the rightward movement of valve lock shaft 122 and valve 124. Balls 139 are urged into recess 155 by spring 167 and lock sleeve 168. Spring 167 is under compression as pressure is applied to the female half. Spring 167 secures lock sleeve 168 in engagement with balls 139 so that they may not be removed from recess 155.

FIG. 1F is a cross-sectional view 100F of the coupling with the male and female valves 124, 302 in the fully open position. Reference numeral 172 indicates bidirectional flow through the fully open coupling.

If the male and female coupling halves are not pressurized, the male coupling half is inserted into the female coupling half urging the inner body member 110 leftwardly. The inner body adaptor 118, the valve dump body 119, and the relief valve 121 are all moved leftwardly under the urging of the male body 301 against the inner body member 110 of the female half. The male valve 302 engages the female valve 124 as coupling progresses. The relief valve 121 engages the bore of the manifold and the spring 135 operable between the relief valve 121 and the valve lock shaft 122 overcomes the spring 180 operable between the male valve 302 and the canister 181 in the male coupling half opening the male valve 302. The female valve 124 opens simultaneously with the opening of the male valve 302.

The coupling may be easily separated if it is not under pressure as the coupling halves are not pressure locked together. Separation in the absence of pressure is accomplished by pulling the male body member 301 and male valve 302 away from the female half of the coupling. A spring 143 operable between the inner body adapter 118 and the sliding sleeve 117 urges the sliding sleeve 117 and retainer 116 rightwardly. As the male valve 302 is withdrawn from the female valve 124, a spring 180 operable between a canister 181 and the male seal retainer 182 urge the male valve 302 to its closed position.

Figure 1G:
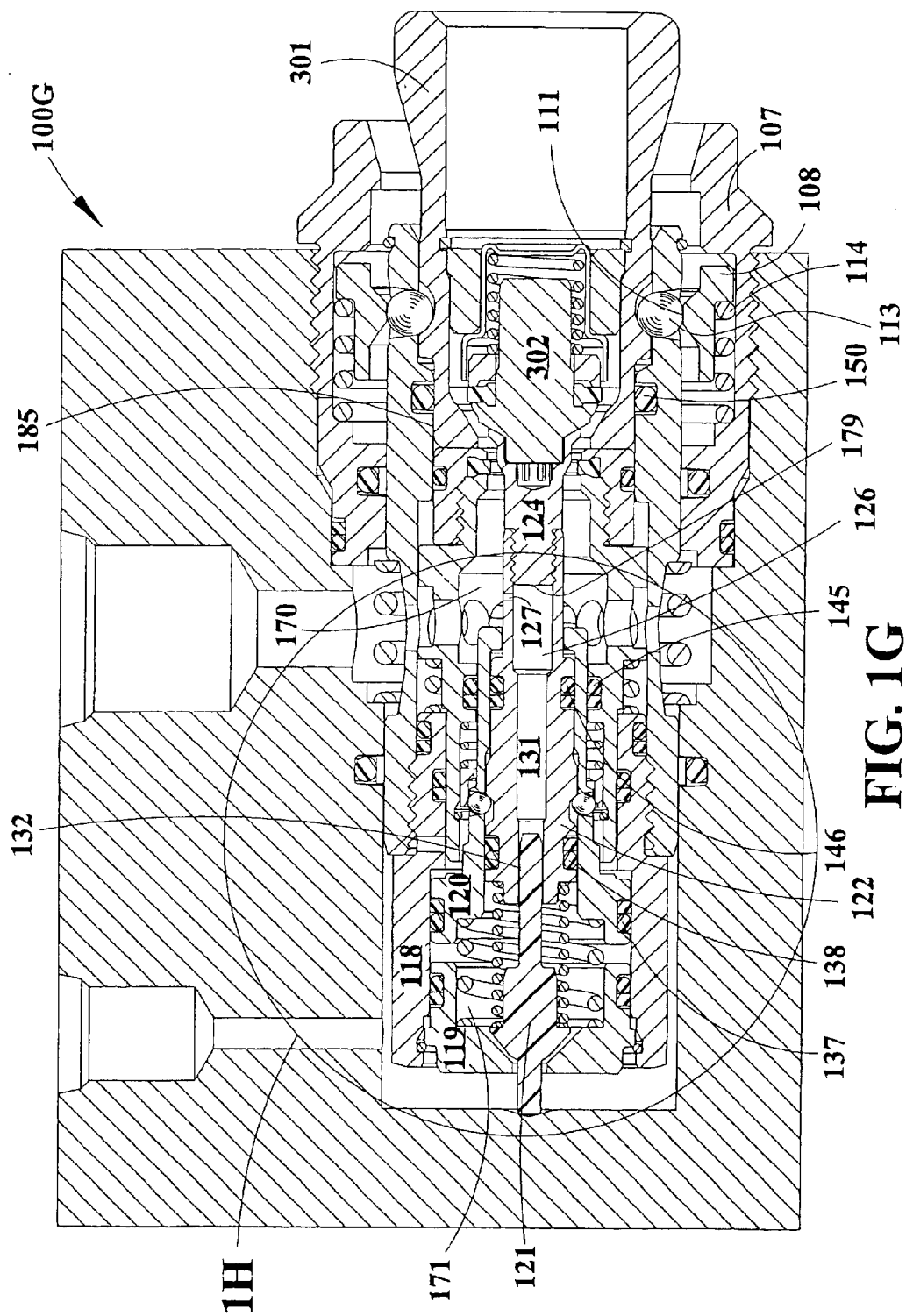
FIG. 1G is a cross-sectional view of the coupling in the process of disconnection with pressure being relieved from the female half of the coupling and the male and female halves of the coupling shifting leftwardly toward the closed position.
Figure 1H:
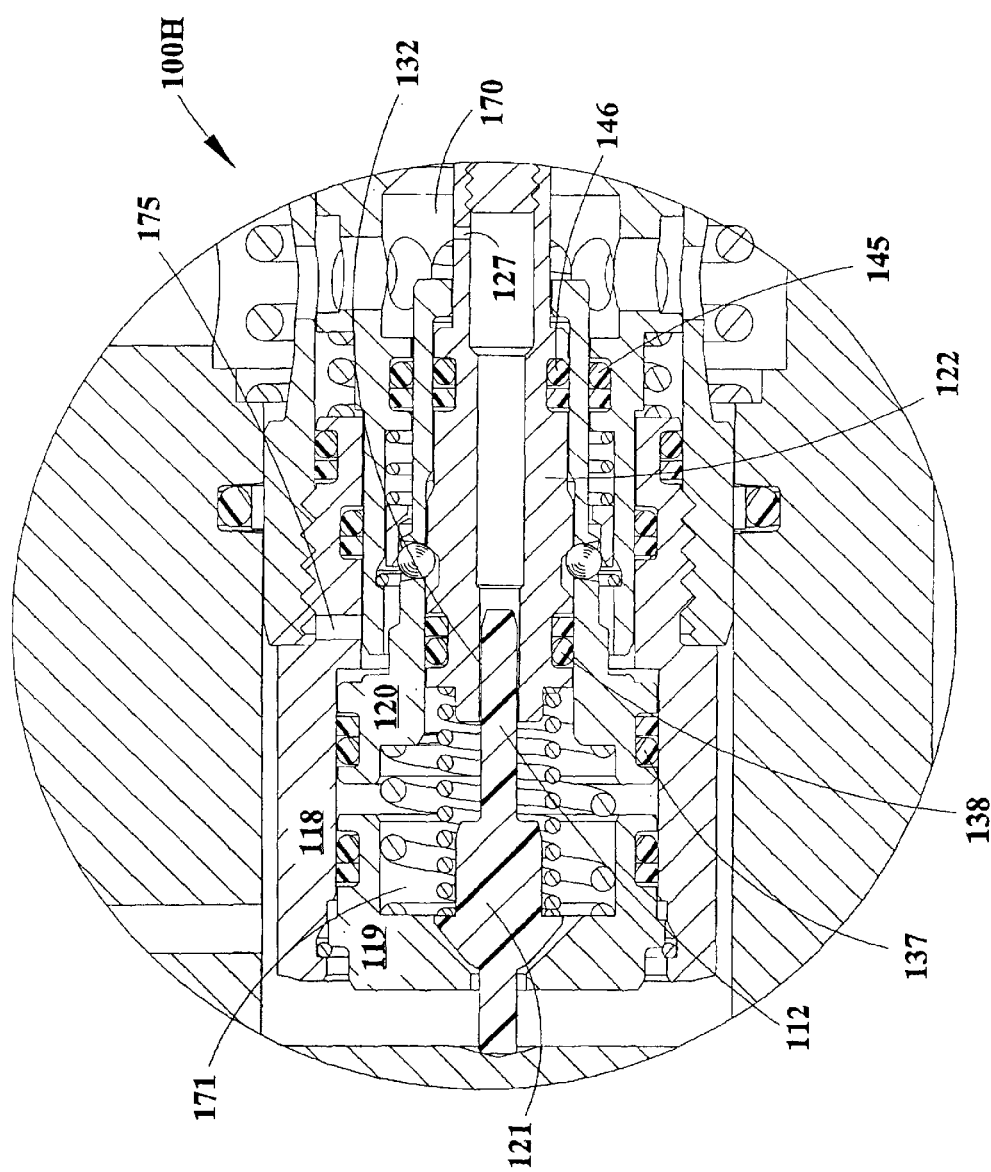
FIG. 1H is an enlargement of a portion of FIG. 1.
Figure 1I:
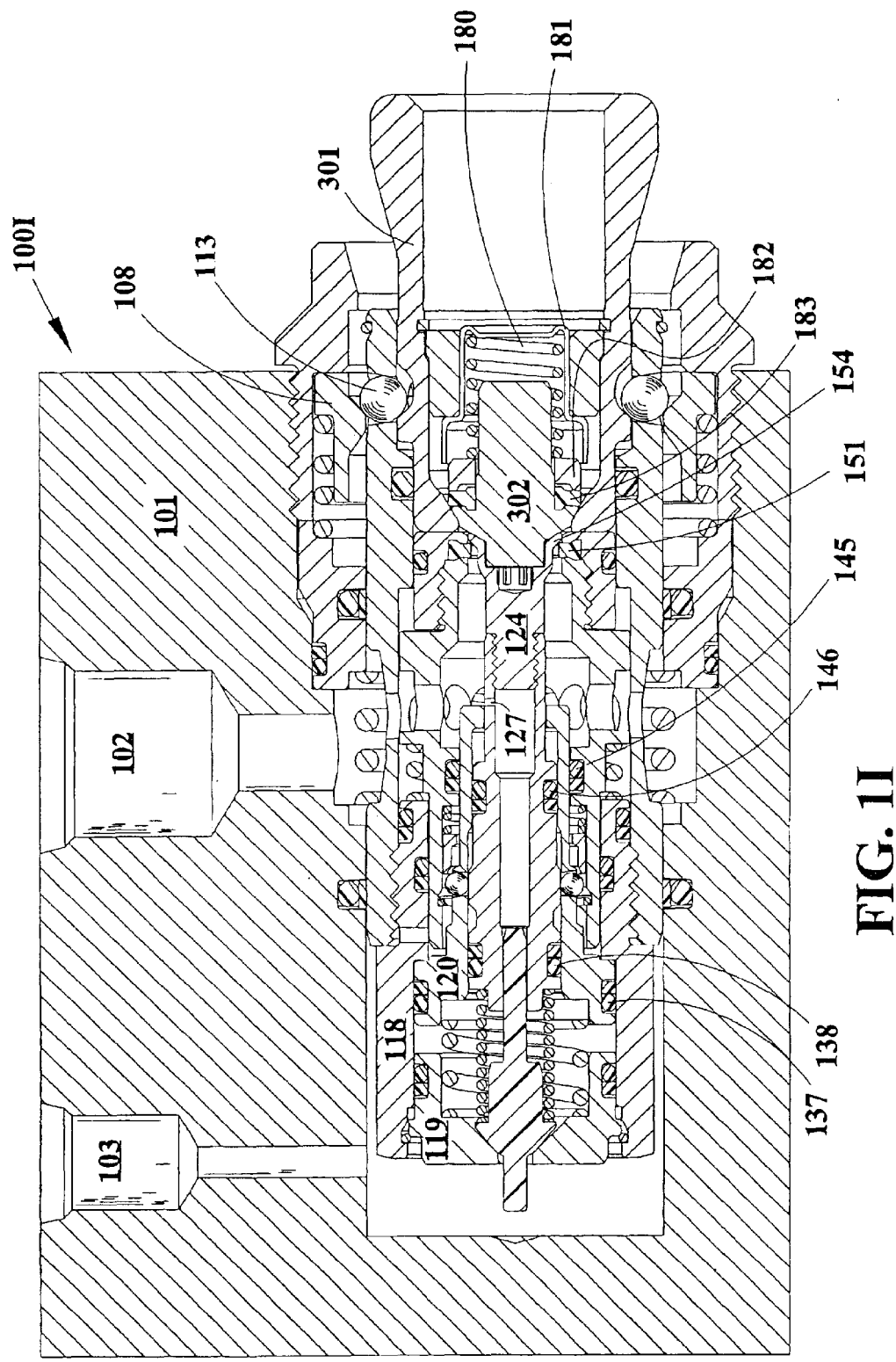
FIG. 1I is a cross-sectional view of the coupling wherein the uncoupling process has proceeded further with the male and female valves in the closed position.

FIG. 1G is a cross-sectional view 100G of the coupling in the process of disconnection with pressure being relieved from the female half of the coupling and the male and female valves 124, 302 of the coupling shifting toward the closed position. Still referring to FIG. 1G as pressure is relieved from the coupling by a person urging the male body 301 leftwardly, pressure is reduced in chamber 171 first followed by a reduction in pressure in the volumes defined by reference numerals 131 and 126, followed by a reduction in pressure in volume 170. To disconnect the pressurized coupling, the male coupling half is urged leftwardly into the female coupling half to vent the female half of the coupling. As the male coupling half is urged leftwardly, pressure in the coupling urges the coupling halves apart and acts upon the interface 185 between the body 301 of the male coupling half and the inner body 110 of the female coupling half locking the detents 113 carried by the inner body member into engagement with the land 111 on the locking sleeve 108. Once pressure is vented from the coupling, the male body removes tension from the detents 113 carried by the inner body member allowing them to move radially inwardly and out of frictional engagement with the land 111 and apertures in the inner body. Referring to FIG. 1H, an enlargement of a portion FIG. 1G, reference numeral 132 illustrates a small circumferential gap around stem 112 and between valve lock stem 122. Gap 132 is in effect an orifice or resistance which retards the flow of hydraulic fluid. Likewise, small passageway 127 is in effect an orifice or resistance which retards the flow of hydraulic fluid.

Referring still to FIGS. 1G and 1H, as valve 121 moves from its seat chamber 171 is vented and pressure on seals 137 and 138 is lowered which results in the leftward movement of lock piston 120 and valve lock shaft 122. Relatively high pressure is applied to seals 145 and 146 which also tend to urge the valve lock piston and the valve lock shaft 122 leftwardly. Movement of the valve lock shaft 122 leftwardly enables closure of male valve 302 trapping pressure behind male valve 302. This enables the safe positioning of an implement until its next use.

The gaps 132 and the passageway 127 are resistances and the volume 170 of pressurized fluid is in effect a capacitance. When pressure is released from volume 171, the reduction of pressure in volume 170 is reduced over a period of time and the decay of pressure in volume 170 is in effect somewhat analogous to the discharge of voltage across a capacitor. The pressure differential across the valve lock shaft shuttles the valve lock shaft leftwardly closing valve 302.

FIG. 1I is a cross-sectional view 100I of the coupling wherein the uncoupling process has proceeded further with the male 302 and female valves 124 in the closed position. In FIG. 1I there is no pressure on the female portion of the coupling and the male valve is closed with pressure trapped behind it. The coupling may now be pulled apart by hand. Instead of being operated by hand the male and female halves of the invention can be adapted to coupling mechanically without the use of a person's hand to provide the force necessary to vent, couple and decouple the coupling halves.

FIGS. 2–6B illustrate the second embodiment of the female half of the coupling. The inner body 110 and the inner body adaptor 118 and components residing therein are in effect a cartridge inserted within housing 280 or in the embodiment of FIG. 1 they are inserted within the manifold 101 and seal retainer 109. The elements of the cartridge have the same structure and function as described above in connection with FIGS. 1–1I.

Figure 2:
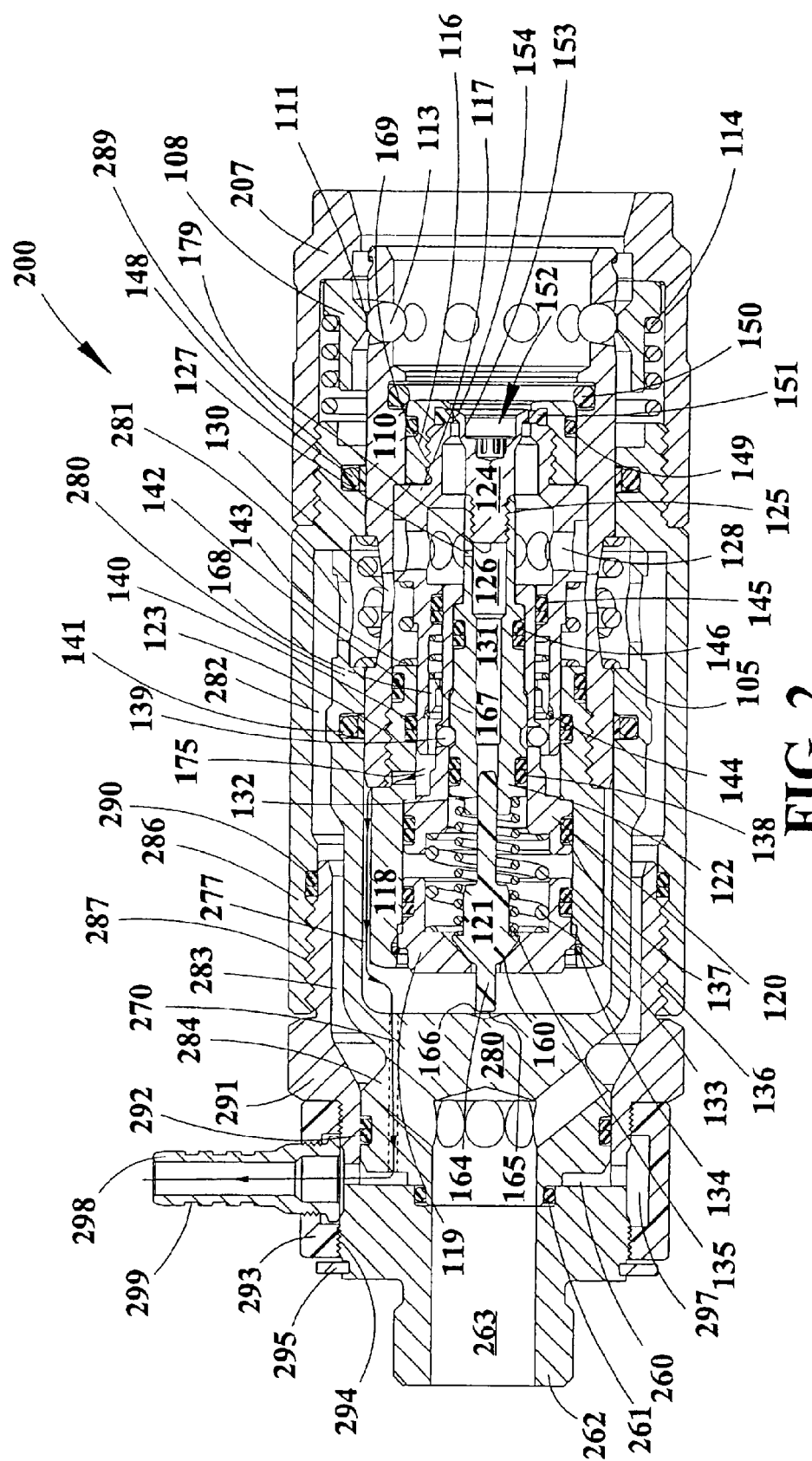
FIG. 2 is a cross-sectional view of the second embodiment of the female half of the coupling illustrated disconnected from the male half of the coupling.

In this embodiment, the female coupling half is rigidly mounted to an adaptor 262 by a threaded interconnection 287 between adaptor 262 and outer body 286. Referring to FIG. 2, a vent passageway 270 is illustrated in housing 280 and leads to passageway 260 which leads to vent annulus 297 formed by vent gland 293 threaded 294 to housing 280. Vent gland 293 is an elastomeric material. A vent 298 is threadably connected to vent gland 293. Serrations 299 on the vent enable hose to be better secured to the vent. Retaining ring 295 secures vent gland 293 to adaptor 262.

Referring to FIG. 2, adaptor 207 is threaded to outer body 286 and retainer locking sleeve 108 against the force of spring 114.

Still referring to FIG. 2, seals 261 and 292 prevent leakage between housing 280 and adaptor 262. Seal 290 prevents leakage between end portion 291 of adaptor 262 and outer body 286.

Still referring to FIG. 2, annulus 282 is formed between housing 280 and outer body 286. Annulus 282 communicates with a plurality of ports/apertures 281 in housing 280. Annulus 283 is formed between end portion 291 of adaptor 262 and housing 280. A plurality of passageways 284 interconnect annulus 283 to bore 263 in adaptor 262. Reference numeral 277 signifies a relief flow path for air residing in volume 175 as previously discussed above in connection with the first embodiment.

FIG. 2 is a cross-sectional view 200 of the second embodiment of the female half of the coupling illustrated disconnected from the male half of the coupling. The connected position (FIG. 3) of the inner body member 110 in relation to the housing 280 and the disconnected position (FIG. 2) of the inner body member 110 in relation to the housing 280 are the same. Similarly, the connected position (FIG. 3) and the disconnected (FIG. 2) position of the female valve 124 are the same.

Figure 3:
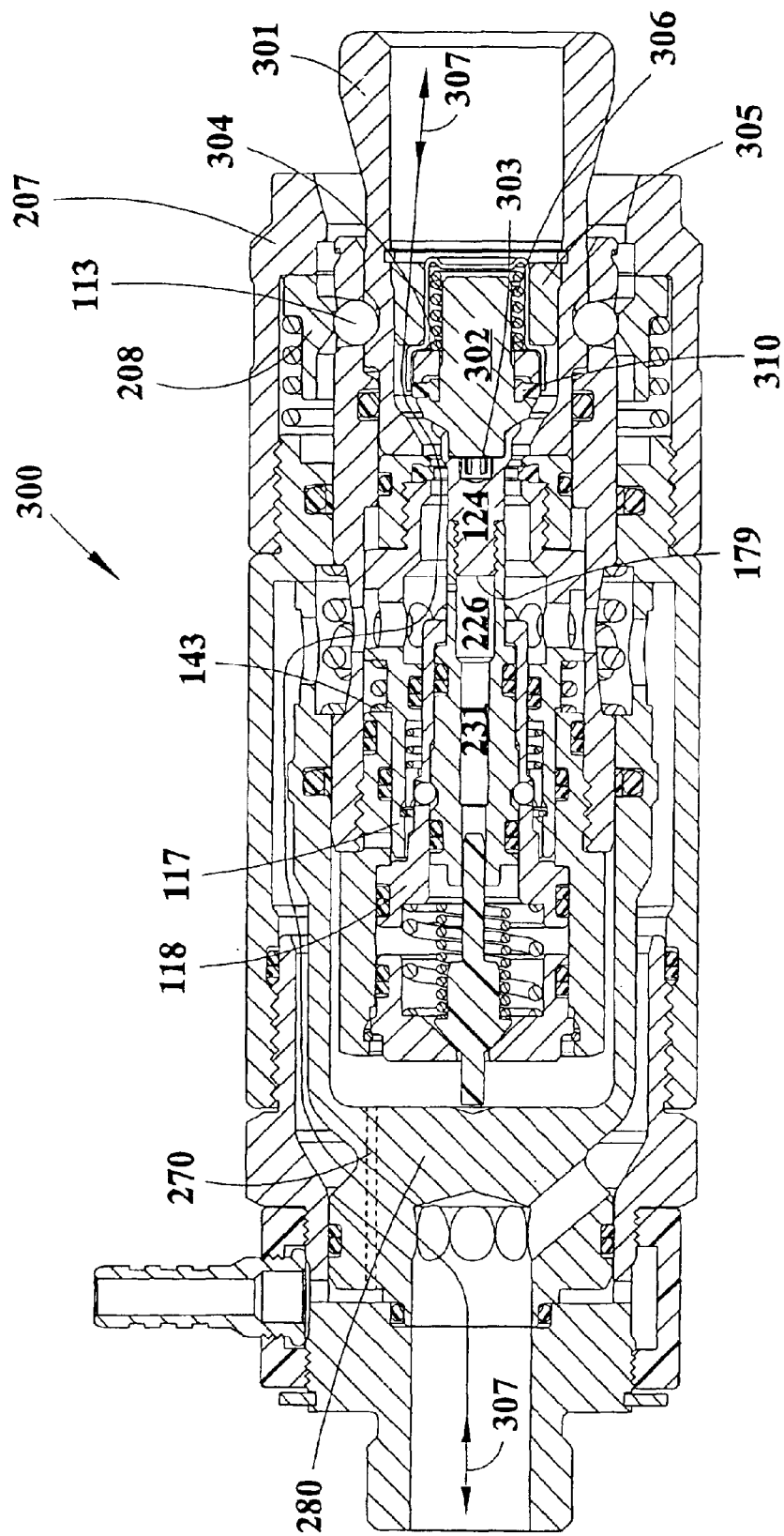
FIG. 3 is a cross-sectional view of the second embodiment of the female half of the coupling illustrated connected (coupled) with the male half of the coupling.

FIG. 3 is a cross-sectional view 300 of the second embodiment of the female half of the coupling illustrated connected (coupled) with the male half of the coupling.

Figure 4:
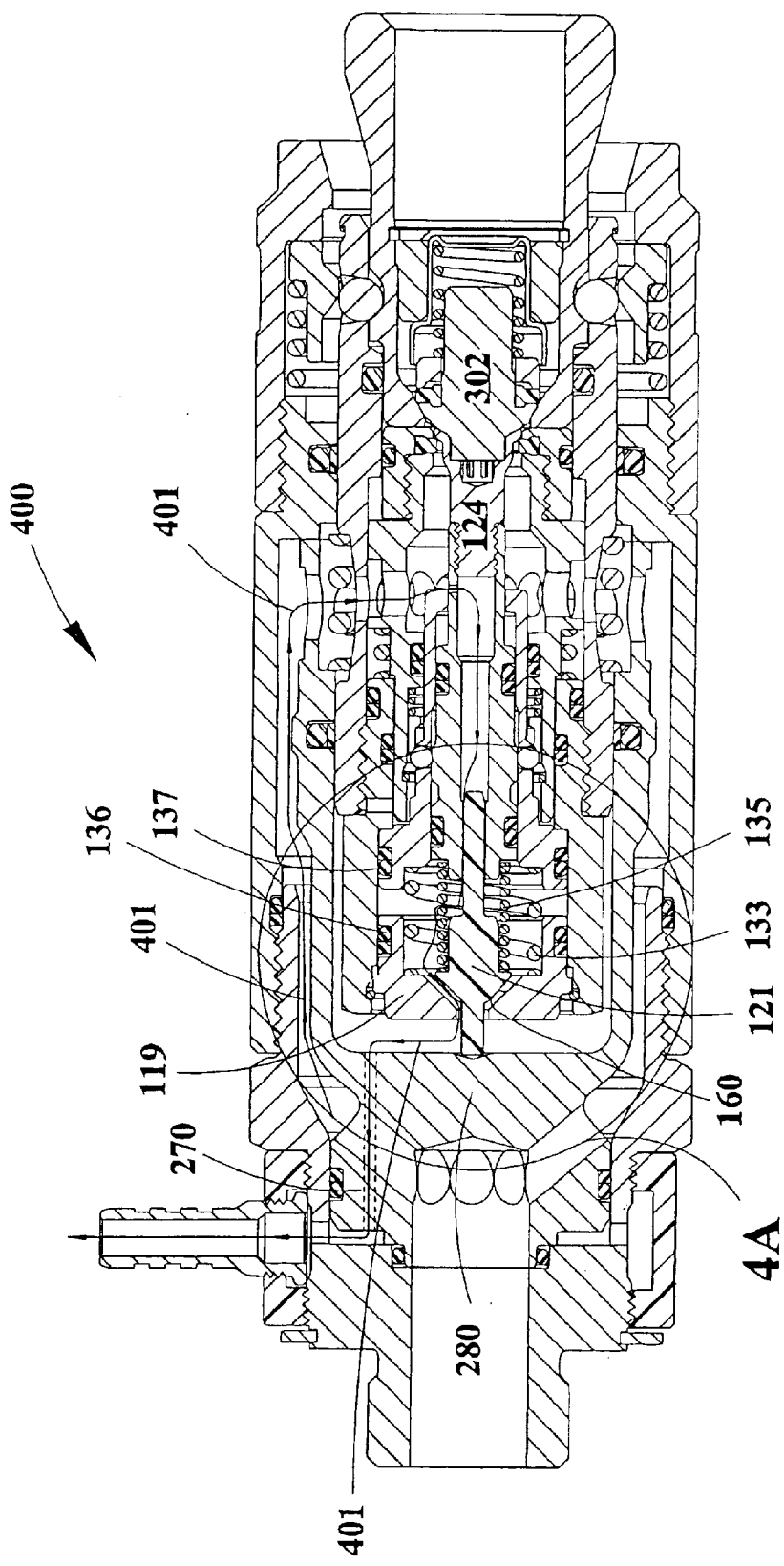
FIG. 4 is a cross-sectional view of the second embodiment of the female half of the coupling illustrated with the valves in the closed position and the female coupling half vented.
Figure 4A:
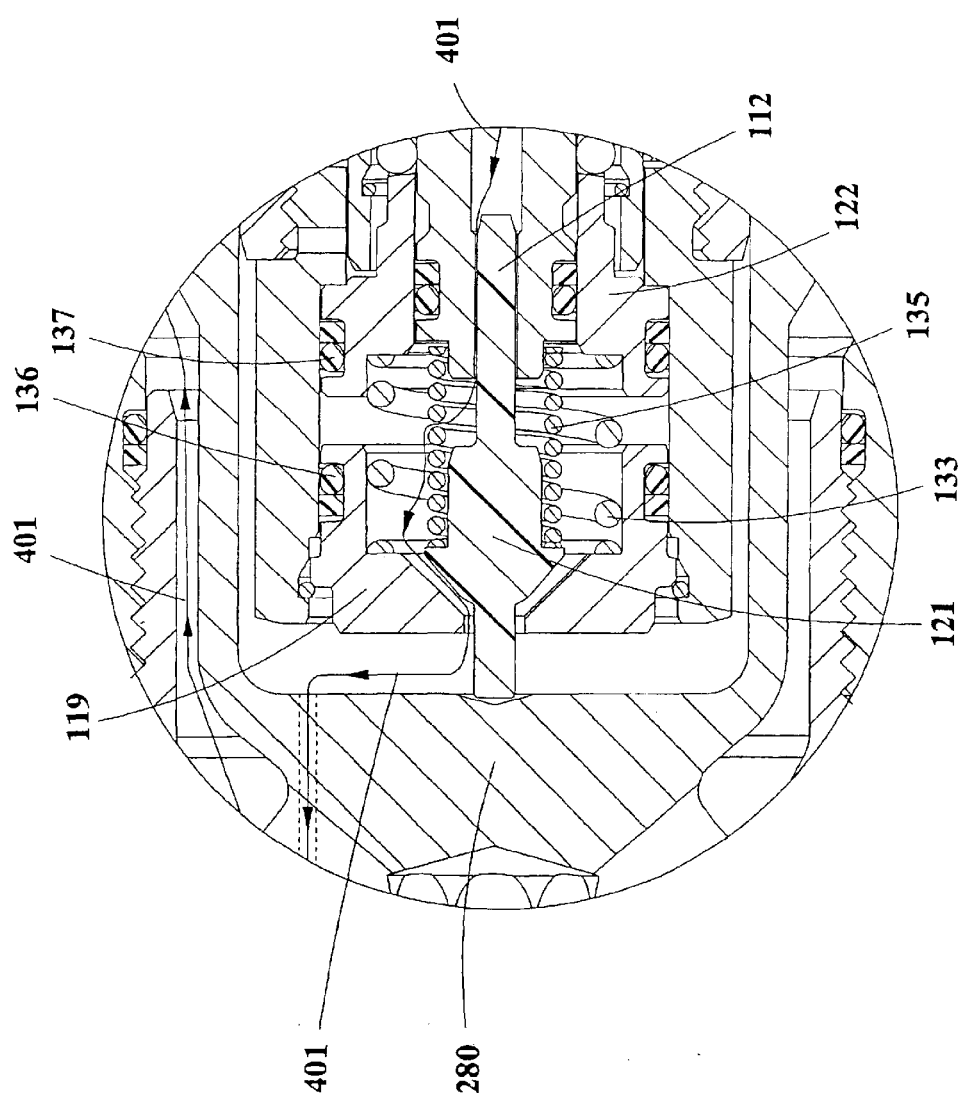
FIG. 4A is an enlargement of a portion of FIG. 4.

FIG. 4 is a cross-sectional view 400 of the second embodiment of the female half of the coupling illustrated with the male valve in the closed position and the female valve partially open coupling half is being vented. FIG. 4A is an enlargement of a portion of FIG. 4. Reference numeral 401 represents the vent flow path of the second embodiment.

FIG. 4 illustrates the position of the valve lock shaft 122 and the position of the inner body 110 (and inner body adaptor 118) moved rearwardly (leftwardly). Valve 121 is illustrated off seat 160 permitting the relief of pressure. Arrow 401 illustrates a relief flow path to atmospheric pressure. Passageway 270 in housing 280 is indicated in phantom. See FIGS. 6 and 6A for other views illustrating passageway 270. FIG. 4A is an enlargement 400A of a portion of FIG. 4 illustrating flow arrow 401 and flow between dump valve stem 112 and valve lock shaft 122.

Figure 5:
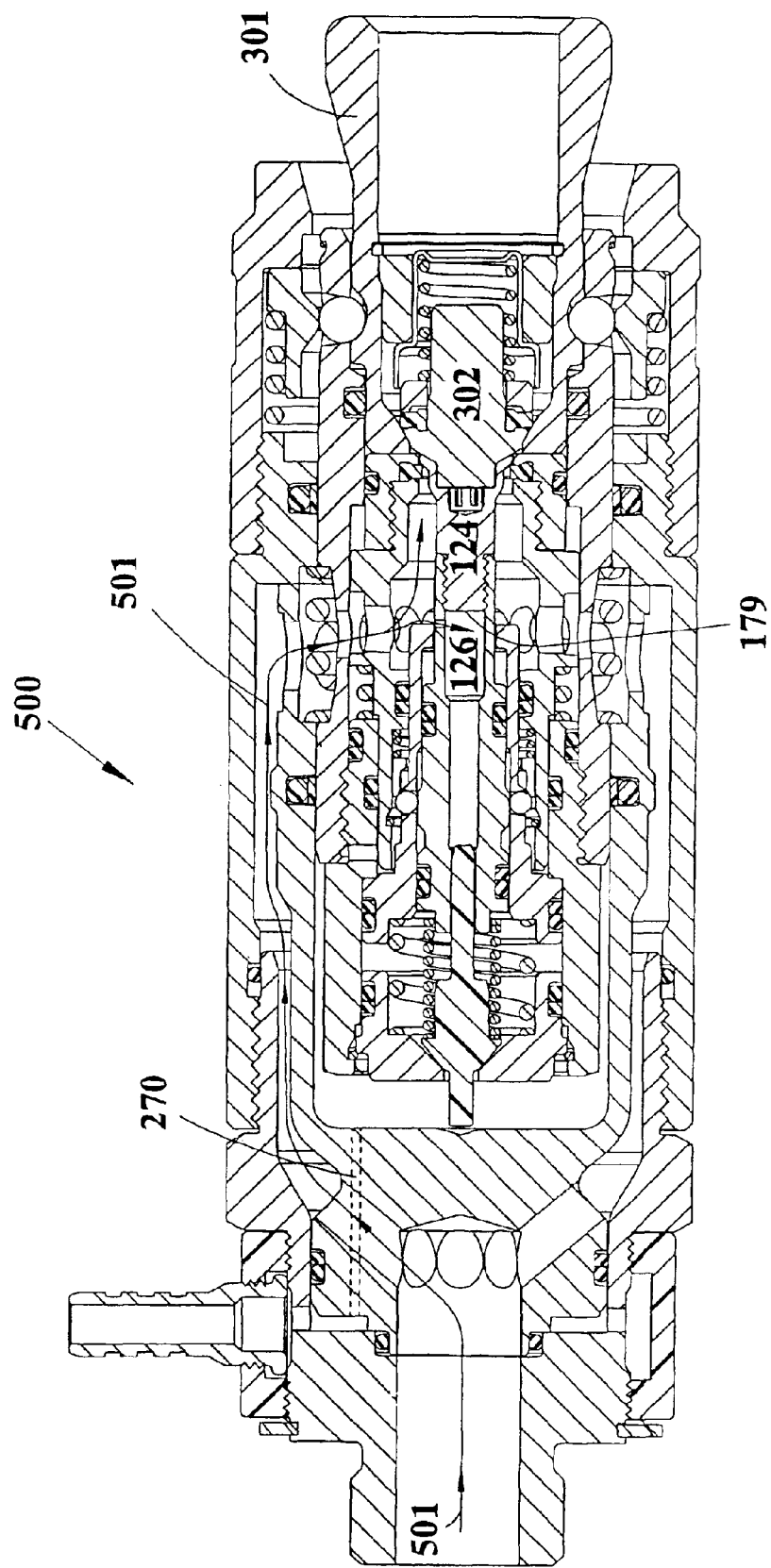
FIG. 5 is a cross-sectional view of the second embodiment of the female half of the coupling illustrated with pressure applied to the female half of the coupling to open the male and female valves.

FIG. 5 is a cross-sectional view of the second embodiment of the female half of the coupling illustrated with pressure being applied to the female half of the coupling as indicated by reference numeral 501 to open valves 124 and 302.

Figure 6:
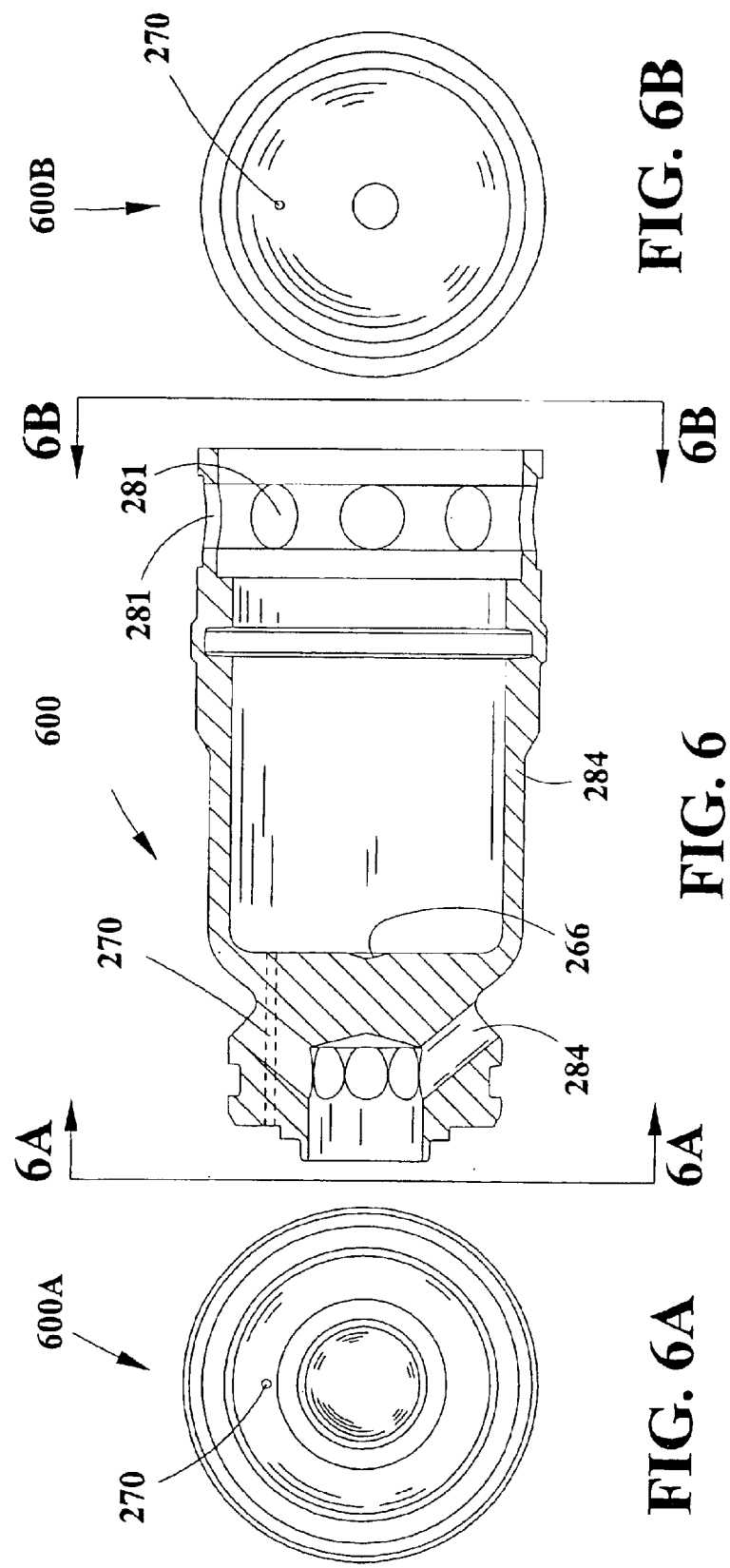
FIG. 6 is a cross-sectional view of the housing.

FIG. 6 is a cross-sectional view of the housing 600 illustrating apertures 281, passages 284 and vent passageway 270 in more detail. FIG. 6A is a left side view 600A of the housing 280 and FIG. 6B is a right side view 600B of the housing 280.

Figure 7:
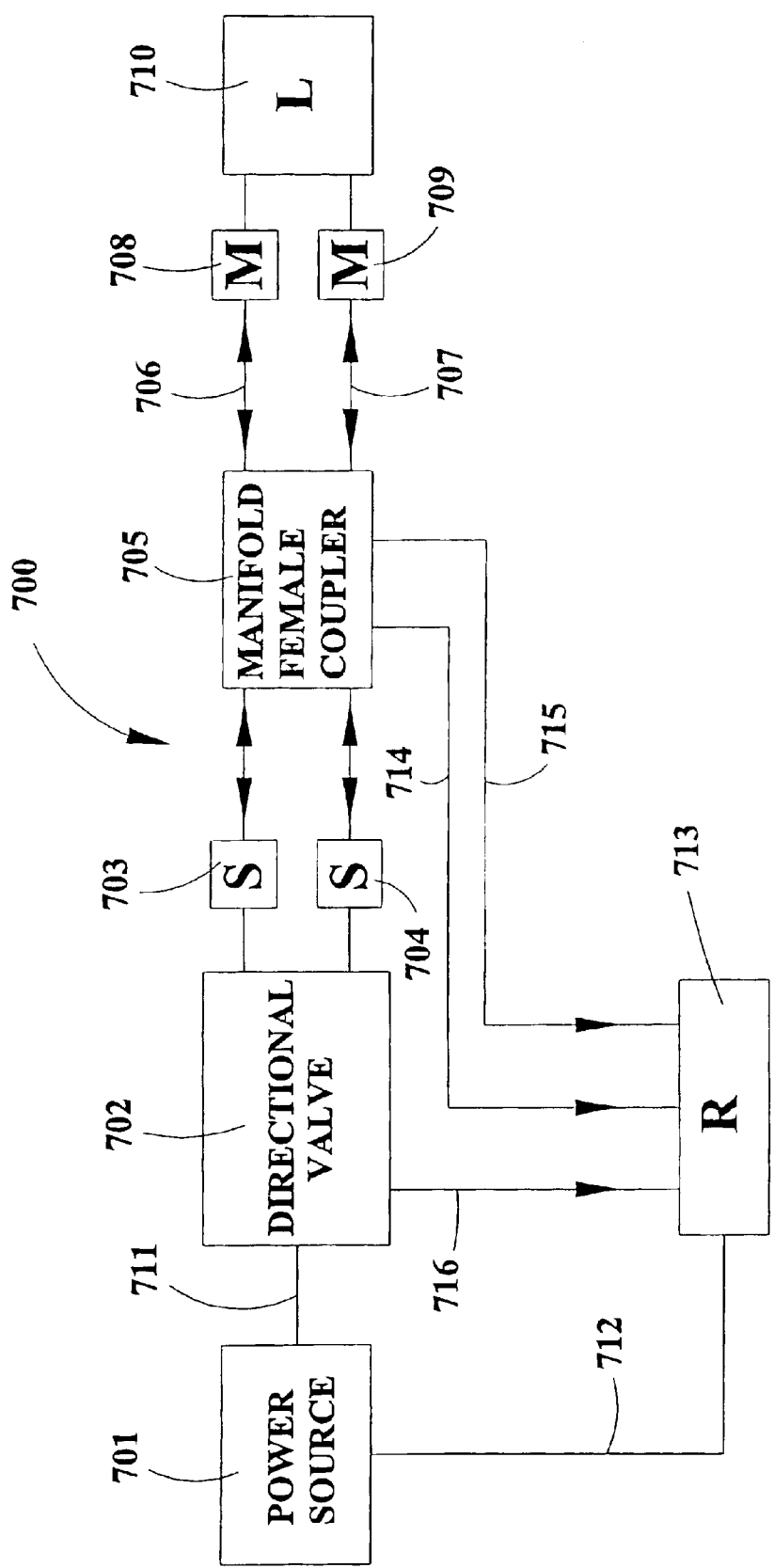
FIG. 7 is a schematic of one application of the first embodiment of the present invention.

FIG. 7 is a schematic 700 representation of an application of the first embodiment of the present invention. Power source 701 is typically a hydraulic pump mounted on a tractor. Hydraulic fluid is pumped through a hydraulic line 711 to a directional valve 702 where it is directed through shut off valves 703, 704 in one or the other directions. Bidirectional arrows between the shut off valves and the manifold 705 indicate that the directional valve may direct fluid to or from a specific coupling mounted within the manifold 705. Bidirectional lines 706, 707 indicate that the male coupling halves 708 may be connected and disconnected from the respective female coupling halves whose cartridges are mounted in the manifold as illustrated and described in connection with FIGS. 1–1I above. The load 710 may be run in either direction as dictated by the directional valve 702. As stated previously it is desirable to maintain the safe position of the implement/load 710 while disconnecting the male coupling halves 708, 709 from the female coupling halves in the manifold 705 by retaining pressure on the male coupling halves. Still referring to FIG. 7, lines 714 and 715 are vent lines from the manifold for the relief of pressure to reservoir 713 at atmospheric pressure. Further, line 716 is a bypass line for directing fluid from the bidirectional valve 702 to the reservoir. Line 712 is a return line (pump suction) line to the power source.

While the invention has been described herein by way of example and with particularity, those skilled in the art will readily recognize that changes and modifications may be made to the invention without departing from the spirit and scope of the appended claims.

We claim:

1. A female coupling half for use with a male coupling half, said male coupling half includes a male valve, said female coupling half comprising: a female valve; a valve lock shaft affixed to said valve and movable therewith; a lock piston; said valve lock shaft includes a recess; said lock piston includes a plurality of apertures; a plurality of detents reside respectively in said plurality of apertures of said lock piston; and, said detents interengaging said recess securing said male and female valves in open position.

2. A female coupling half for use with a male coupling half as claimed in claim 1, said female half further comprising: a lock sleeve, and said lock sleeve restraining said detents from radial movement.

3. A female coupling half for use with a male coupling half as claimed in claim 2, said female half further comprising: a sliding sleeve; and, a spring operable between said lock sleeve and said sliding sleeve.

4. A female coupling half for use with a male coupling half as claimed in claim 3 wherein said valve lock shaft includes an exterior, a hollow inner core, and a passageway interconnecting said exterior and said hollow inner core.

5. A female coupling half for use with a male coupling half as claimed in claim 4 wherein said female valve is affixed to said valve lock shaft by a threaded interconnection.

6. A female coupling half for use with a male coupling half as claimed in claim 4 wherein said female valve includes an end portion and an opening for receiving said male valve member.

7. A female coupling half for use with a male coupling half as claimed in claim 6 wherein said end portion is flared.

8. A female coupling half for use with a male coupling half, said male coupling half includes a male valve, said female coupling half comprising: a female valve; a valve lock shaft having a circumferential recess therein; a lock piston; said lock piston includes a plurality of circumferentially spaced apertures; a plurality of detents residing, respectively, in each of said circumferentially spaced apertures; a lock sleeve forcibly restraining said detents in said recess of said valve lock shaft when said male and female coupling halves are coupled together; and, said detents removably residing in said circumferential recess of said valve lock shaft when said male and female coupling halves are uncoupled.

9. A female coupling half for use with a male coupling half, said male coupling half includes a male valve and a male body, said female coupling half comprising: a female valve; a retainer for securing a seal; said female valve includes a lip and a recess; said lip engages said seal when said coupling halves are disconnected; and, during engagement of said coupling said male body engages said retainer followed by said male valve engaging said recess and said lip of said female valve such that said seal is spaced apart from said lip of said female valve partially opening said female valve.

10. A female coupling half for use with a male coupling half as claimed in claim 9 wherein said female coupling half is pressurized opening said male valve and further opening said female valve.

11. A female coupling comprising a female half for use with a male coupling half; said male coupling half includes a body and a male valve, said female coupling half includes an inner body and a retainer; said inner body includes a detent carried in an aperture; said male body includes a circumferential recess therein; a locking sleeve having a land; said male half and said female half being pressure locked together as said circumferential recess and said locking sleeve engage said detent when said coupling is pressurized; and, said male and female coupling halves being separable and said detent being movable with respect to said recess and said land on said locking sleeve when said coupling is not pressurized.

12. A coupling as claimed in claim 11 further comprising a plurality of detents carried by said inner body member in a respective plurality of apertures.

* * * * *